July 4, 1961  A. CLAUD-MANTLE  2,991,106
BOX LID FASTENER
Filed Dec. 14, 1956  2 Sheets-Sheet 1
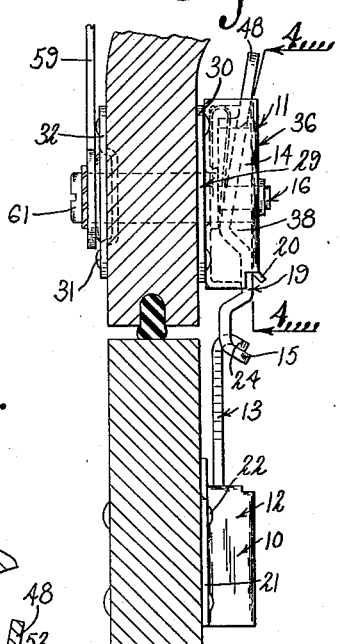
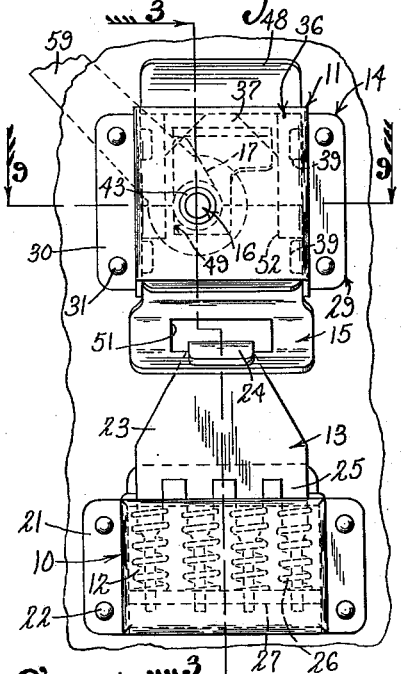
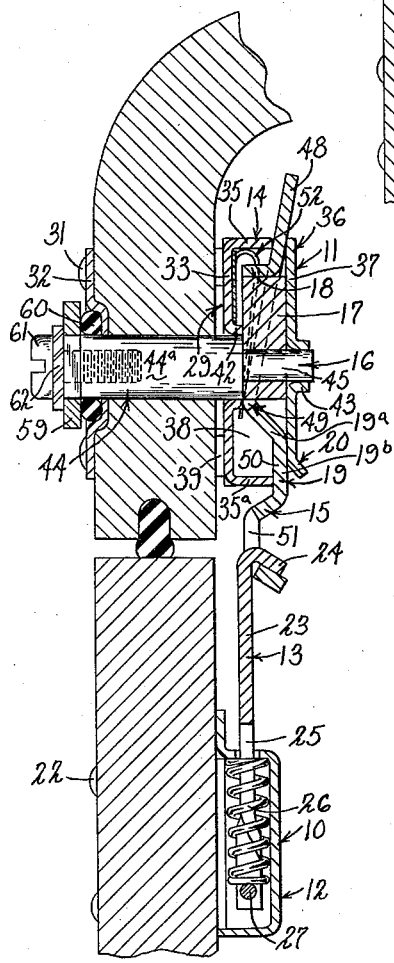
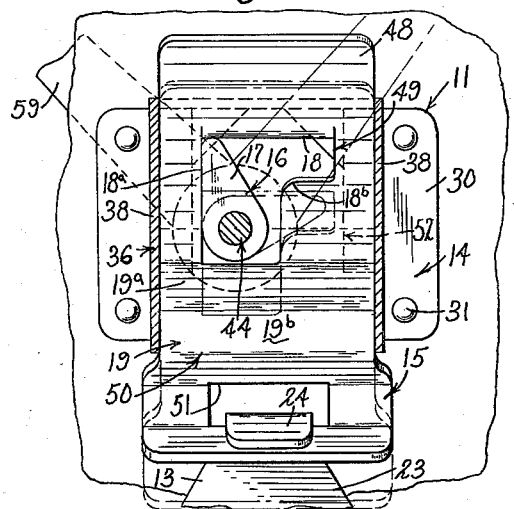
INVENTOR
Arthur Claud-Mantle
BY Rockwell & Bartholow
ATTORNEYS July 4, 1961
A. CLAUD-MANTLE
2,991,106
BOX LID FASTENER
Filed Dec. 14, 1956
2 Sheets-Sheet 2
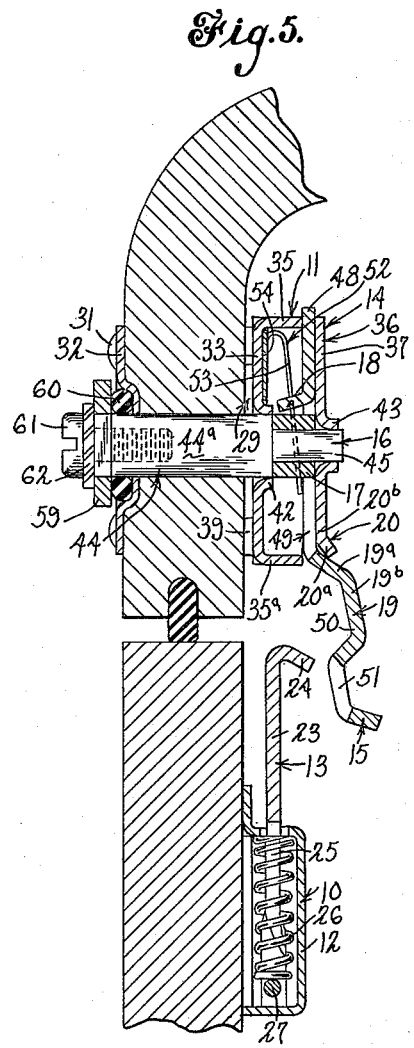
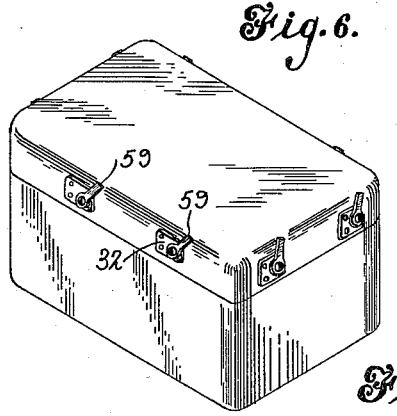
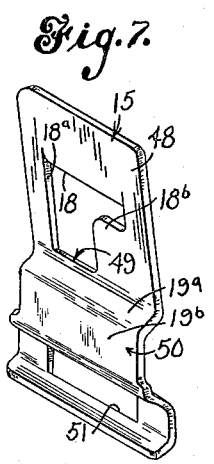
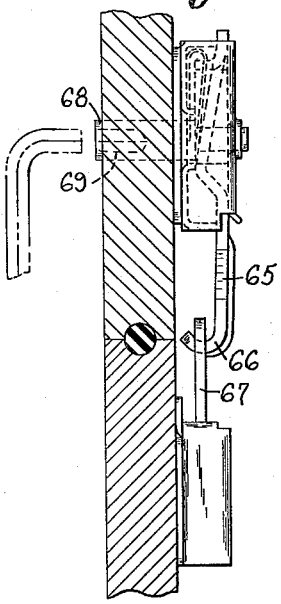
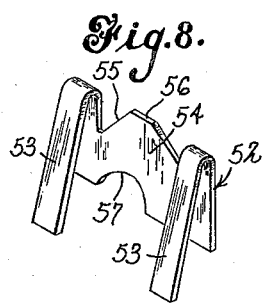
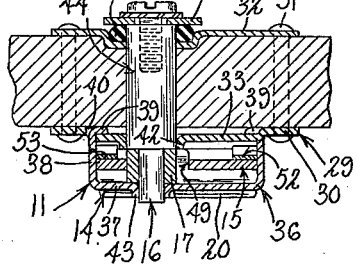
INVENTOR
Arthur Claud-Mantle
BY Rockwell & Barthober
ATTORNEYS

United States Patent Office 2,991,106
Patented July 4, 1961

2,991,106
BOX LID FASTENER
Arthur Claud-Mantle, Trumbull, Conn., assignor to The Bassick Company, Bridgeport, Conn., a corporation of Connecticut
Filed Dec. 14, 1956, Ser. No. 628,338
5 Claims. (Cl. 292—65)

This invention relates to fasteners and, while not limited thereto, relates to fasteners particularly useful on boxes, especially boxes and like containers used for carrying and storing articles which must be protected from moisture, vapor and the like. Such containers usually include a lower body part, an upper lid part, and gasket means carried by one of the parts and adapted to provide an effective seal between the parts when compressed by the latter through the action of the fasteners.

One object of the invention is to provide an improved fastener which is especially useful on containers such as described above and which exerts a resilient downward pull on the lid of the container.

Another object of the invention is to provide a fastener such as characterized above, including a casing, a catch member extending into the casing for vertical movement relatively to the latter, and cam means extending into the casing and operable to move the catch member to the latched position thereof.

Another object of the invention is to provide a fastener such as characterized above, having a tiltable spring-pressed catch member which, on vertical movement of the member in one direction, is tilted by a cam part of the member co-acting with a part of the casing.

Still another object is to provide a fastener which strongly resists such dislocation of the parts thereof as would effect springing open or release of the fastener, and which may not be tampered with as easily as some fasteners.

A further object is to provide a fastener which is rugged and will not easily get out of order, which is dependable in service, and which is constituted by relatively few and simple parts.

Other objects of the invention will be apparent from the following detailed description of two forms of the fastener which are illustrated in the accompanying drawings by way of example.

In the drawings:

FIG. 1 is a fragmentary view of a container or box illustrating the same in vertical section and illustrating a fastener embodying the invention;

FIG. 2 is a fragmentary elevational view illustrating the outer face of the fastener, the fastener being shown in latched condition;

FIG. 3 is an enlarged sectional view taken on line 3—3 of FIG. 2;

FIG. 4 is a sectional view taken on line 4—4 of FIG. 1;

FIG. 5 is a sectional view similar to FIG. 3 but illustrating the fastener in unlatched condition;

FIG. 6 is a perspective view of a container or box equipped with a plurality of the fasteners;

FIG. 7 is a perspective view of the catch member;

FIG. 8 is a perspective view of the spring for the catch member;

FIG. 9 is a sectional view taken on line 9—9 of FIG. 2; and

FIG. 10 is a view similar to FIG. 1 but illustrating a modified form of the fastener applied to a container or box of slightly different construction.

For the protection of instruments, aircraft parts and other articles or apparatus requiring protection from moisture, vapor or the like, containers made of metal or other suitable material have been used and fasteners have been employed with such containers to exert pressure on the container body and lid to compress a gasket or like sealing member therebetween. Heretofore, the fasteners for such containers have, in some instances, been open to certain objections and one aim of this invention is to overcome these objections. A typical container or box of this kind is shown in FIG. 6 and, as illustrated in this view, the box has a lid which is relatively deep so that it is similar in form to the box body. The box is shown merely by way of example, and by way of example FIG. 6 illustrates a container equipped at each of the four sides with two fasteners the parts of which are of a new construction and arrangement and embody the invention. A resilient gasket of rubber or the like is carried by one of the box elements and is adapted to be interposed between the assembled elements and compressed therebetween when and as the fasteners are operated to latch the lid element to the body element. In the form shown in FIGS. 1 through 9, the gasket or sealing member is generally of oblong form in cross section while in the form illustrated in FIG. 10 the gasket or sealing member is slightly out of round in cross section. In each of the illustrated forms, the box lid is provided with a side wall structure which may be aligned and flush with the side wall structure of the box body, and the gasket extends into a groove formed in one or both of the opposing edges of the box elements.

As each of the fasteners, illustrated on the box shown in FIG. 6, is identical to every other fastener on the box a description of one will suffice. By way of example only, both forms of the fastener are illustrated as applied to the inside of the box, substantially all of the mechanism being disposed within the box so that even the fastener is in a large measure protected by the box. It will be understood that the disposition of a large part of the fastener mechanism within the box tends to protect the mechanism from tampering. Also by way of example only, both forms of the fastener are illustrated as having the retainer for the catch mounted on the box body.

The fastener, as illustrated, comprises a retainer including a casing fixed to the box body and a latching member upwardly extensible from the casing for engagement with a catch and spring urged in a downward direction to exert a resilient downward pull on the latter, and a catch including a casing fixed to the box lid, a catch member engageable with the latching member and extending upwardly into the last-mentioned casing for vertical movement relatively to the latter, and cam means extending into the last-mentioned casing and having a part swingable on a horizontal axis and co-acting with a part of the catch member to move the catch member upwardly to the latched position thereof so that the box body and the lid are resiliently drawn together. Furthermore, for a general understanding of the illustrated fastener, it may be pointed out here that the catch member is tiltable toward and away from the latching member to engage and disengage the latter, the catch member being spring pressed to one of the tilted positions thereof, and the catch member being provided with a second cam part which on upward movement of the catch member cooperates with a cam part of the casing into which the catch member is extensible, to cam the latter to the other tilted position thereof which, in the illustrated case, is the position to engage the latching member.

In the form shown in FIGS. 1 through 9, the retainer is indicated generally at 10 and the catch is indicated generally at 11. The casing of the retainer is indicated at 12, and the spring-pressed latching member extensible from the casing 12 is indicated at 13. In the catch 11, the casing is indicated generally at 14, the spring-pressed catch member at 15 and said cam means at 16. The part of the cam means swingable on a horizontal axis and cooperating with the catch member to move the latter upwardly is indicated at 17, and the part of the catch member which cooperates with the part 17 is indicated at 18. The cam part of the catch member 15 that cooperates with the casing 11 to tilt the catch member toward the latching member is indicated at 19, and the part of the casing 11 which cooperates with the cam part 19 is indicated at 20.

Turning now to the details of the fastener shown in FIGS. 1 through 9, the retainer casing, which is preferably formed of sheet metal, is provided with top, bottom, side and outer walls and is of shallow box-like construction. The casing 12 is also provided with ears 21 by which the casing is secured to the side wall structure of the box body by suitable fasteners 22. The latching member 13, extensible from the casing 12, may also be constructed of sheet metal and may have the form best shown in FIGS. 2 and 3. The latching member 13 is provided with an upper generally wedge-shaped part 23 having a hook 24 at the upper extremity thereof. A number of laterally spaced fingers 25 are suspended from the part 23 and extend through the top wall of the casing 12 in slidable relation thereto. A plurality of compression springs 26 are disposed in the casing 12, each spring 26 embracing one of the fingers 25. A retainer pin 27 extends transversely through the distal ends of the fingers 25, the arrangement being such that the springs 26 are compressed between the top wall of the casing 12 and the pin 27. When the latching member 13 is in the inoperative or unlatched position thereof (see FIG. 5) the distal ends of the fingers 25 abut the bottom wall of the casing 12 to limit downward movement of the member 13, the springs 26 being rather strongly compressed in the last-mentioned position of the member 13. The spring-pressed latching member 13 is displaced upwardly from the position of FIG. 5 to the position of FIG. 3 through the action of the catch member 15 and, when the latching member 13 is in the position of FIG. 3, exerts a very strong downward pull on the box lid through the catch member 15. As the retainer 10 is described in detail in U.S. Patent No. 2,704,218, granted March 15, 1955, it is believed that the foregoing description of the retainer 10 will suffice.

Turning now to the catch 11 which cooperates with the retainer 10, the catch casing 14, which is preferably formed of sheet metal, includes a base member 29 having ears 30 by which it may be secured to the side wall structure of the box lid with suitable fasteners 31 which not only secure the base 29 on the box lid but extend through the side wall structure of the box lid and secure an escutcheon plate 32 to the lid at the face thereof remote from the base 29. The attaching ears 30 of the base 29 are interconnected by a web 33 spaced outwardly from the side wall structure of the lid to a slight extent by the ears 30, the web 33 being provided with upwardly spaced outwardly extending lugs or walls, indicated at 35 and 35ª respectively. The catch casing also includes a cover plate 36 having a web portion 37 spaced outwardly from the walls 35 and 35ª to receive therebetween the upwardly slidable catch member 15 which extends through the casing with sufficient clearance for some tilting movement. At the sides thereof, the web 37 is provided with integrally formed inwardly extending flanges 38 which provide the side walls of the casing 14. Each flange 38 is provided with two upwardly spaced lugs 39 which are received in registering slots 40 provided in the web 33, the lugs being bent over at the remote side of the web 33 to secure the cover plate on the base 29. The lugs 39 of each flange 38 are bent over in opposing relation to the lugs of the other flange 38 and extend into the aforementioned space formed between the side wall structure of the box lid and the web 33.

The web 33 of the base 29 is provided with an integrally formed outwardly extending boss 42 disposed below and slightly to one side of the center of the web 33. The web 37 of the cover plate is provided with a similar boss 43 registering with the boss 42. The cam means 16 includes a cam shaft 44 which extends through the side wall structure of the box lid passing through the escutcheon plate 32. The shaft 44 has a body part 44ª which is journaled in the boss 42, and has an extension 45 of smaller diameter which is journaled in the boss 43. Within the catch casing 14, the cam member 17 is disposed on the shaft extension 45 and is held on the latter in angularly rigid relation, as by welding. As shown in FIG. 3, the cam member 17 is closely confined between the boss 42 and the web 37 so that axial movement of the member 17 is prevented. The cam member 17, which may be formed conveniently of cold, rolled steel, is generally of oval form, having the vertex thereof engageable with the cam part 18 of the catch member.

The catch member 15, best shown in FIG. 7, is an upwardly elongated member having a substantially straight upper portion 48 in the lower part of which is a window or cam aperture 49 bounded at the top by a lip which forms the cam part 18. The lip 18 is inclined downwardly and inwardly, as best shown in FIG. 5. Adjoining and below the straight portion 48 the catch member 15 is provided with a rather angular or flattened S-shaped portion 50 (see FIG. 7) the upper part of which forms the cam part 19 for cooperation with the cam part 20 of the catch casing. The lower part of the S-shaped portion 50 is provided with a horizontally elongated rectangular aperture 51 through which the hook 24 of the latching member extends in the latched position of the catch member 15. As shown in FIG. 3, the hook 24 faces outwardly and the upper extremity of the hook is inclined downwardly and outwardly at approximately the same angle as the lower extremity of the portion 50 of the catch member, the upper extremity of the hook 24 engaging and overlying the lower extremity of the portion 50 in the latched position of the catch member.

As indicated above, the catch member 15 is rather closely received between the web 37 of the cover plate and the top and bottom walls 35 and 35ª, respectively, of the base. The upper or cam part 19 of the portion 50 of the catch member is inclined downwardly and outwardly, as at 19ª, and then more sharply downwardly, as at 19ᵇ. The cam part 19 of the catch member cooperates with the cam part 20 of the casing cover which includes a lower portion 20ᵇ of the web 37 which lies in a substantially vertical plane, the cam part 20 also including a lip-like portion 20ª of the web adjoining and below the portion 20ᵇ thereof and inclined downwardly and outwardly at an angle slightly greater than that of the inclined portion 19ª of the catch member. As shown in FIG. 3, for example, the web or lip portion 20ª, which constitutes the lower extremity of the web 37, terminates at a point in or close to the horizontal plane of the wall 35ª. The upper edge of the web 37 is substantially flush with the upper wall 35. When the cam member 17 is swung by the shaft 44 to move the spring-pressed catch member 15 from the released position of FIG. 5 to the latched position of FIG. 3, the catch member is raised, the cam portion 19ª cooperating with the cam portion 20ª of the casing to tilt the member 15 inwardly toward the hook 24 of the latching member. Continued upward movement of the catch member 15 effects engagement of the latter with the latching member 13 and effects cooperation of the cam portion 19ᵇ of the catch member with the cam portion 20ᵇ to move the catch member to the tilted position of FIG. 3. Further inward tilting movement of the catch member 15 is prevented by the lower wall 35ª of the base which, in the last-mentioned position of the member 15, engages the latter at the side thereof remote from the cam part 20, as shown in FIG. 3. The space between the upper wall 35 of the base and the web 37 of the casing cover is sufficient to permit tilting movement of the portion 48 of the catch member 15 to the position shown in the last-mentioned view.

It will be understood that when the catch member 15 is moved from the released position of FIG. 5 to the latched position of FIG. 3, the inclined cam part or lip 18 of the catch member moves over the cam member 17 in an inward direction and assumes the angular position relative to the member 17, shown in FIG. 3. In the last-mentioned position of the cam part or lip 18, the lip is in engagement with the member 17 throughout the depth (see FIG. 3) of the lip. The leaf spring 52, best shown in FIG. 8, is interposed between the web 33 of the base and the straight portion 48 of the catch member to bias the catch member toward the position shown in FIG. 5. As shown in FIG. 8, the leaf spring 52 is generally of yoke shape and has two bent arms 53 facing in the same direction and interconnected by a body part 54. It will be observed that each arm 53 is not bent sharply from the body part 54 but is bent on a radius. The body part 54 is cut away, as at 55, adjacent each arm. The leaf spring 52 in the catch casing is positioned in part by the straight upper edge portion 56 of the body part which abuts (see FIG. 4) the upper wall 35. The spring 52 is also positioned in part by a recess 57 formed in the lower edge of the body part and into which the boss 42 extends. The body part 54 of the spring abuts the web 33 and the arms 53 bear against the straight portion 48 of the catch member at the respective sides of the window or cam aperture 49, as indicated in FIGS. 4 and 5. In the position of FIG. 5, the straight portion 48 of the spring-pressed catch member is in flatwise engagement with the web 37.

As shown in FIG. 4, the cam shaft 44 and the cam member 17 carried thereby are so positioned relatively to the window or cam aperture 49 that swinging movement of the vertex of the member 17 in one direction past the vertical (counterclockwise in FIG. 4) is limited by the upwardly extending side 18ᵃ of the cam aperture 49, the member 17 being engageable with the side 18ᵃ of the cam aperture 49, and the arrangement being such that the member can swing in the last-mentioned direction only a short distance past the vertical. It will be apparent from the foregoing that when the cam member 17 is engaged with said side 18ᵃ of the cam aperture 49 the catch member is fully latched, and it will also be apparent that to release the catch member 15 the vertex of the cam member 17 must first be returned to the vertical thereby raising the catch member 15 and further compressing the springs 26 associated with the latching member 13. This tends to inhibit such dislocation of the parts of the fastener as would effect springing open or release of the fastener, as on impact of the box with another object, for example. The upwardly extending side of the cam aperture 49 opposite the side 18ᵃ is offset to form a rounded shoulder 18ᵇ facing upwardly and spaced below the lip 18 a distance somewhat less than the width of the oval cam member 17 at the base thereof. When and as the cam shaft 44 is turned to swing the cam member 17 from the latched or full-line position of FIG. 4 to the unlatched or broken-line position of FIG. 4, the cam member 17 strikes the shoulder 18ᵇ, camming the catch member 15 downwardly to assure full release of the fastener.

When the fastener is unlatched, the cam member 17 occupies the position shown in FIG. 5 and shown in broken lines in FIG. 4. In the last-mentioned position of the cam member 17, the lip 18 of the catch member is engaged with the base of the oval member 17, and this engagement of the latter with the lip 18 limits downward movement of the catch member. It will be understood that when and as the cam member 17 is swung from the broken-line position of FIG. 4 to the full-line position of the same figure, the vertex of the member 17 engages and moves along the lip 18 throughout approximately half the length of the latter. When the fastener is latched the upper portion of the catch member 15 protrudes from the top of the catch casing to the extent indicated in FIGS. 3 and 4. From the foregoing it will be understood that when and as the fastener is unlatched the leaf spring 52 not only effects tilting movement of the catch member 15 but also supplements the action of the springs 26 to urge the member 15 downwardly when the cam portion 19ᵃ of the member 15 reaches and co-operates with the lip portion 20ᵃ of the catch casing.

In the instant form, the cam shaft 44 is operated at the face of the box lid remote from the catch casing. At the side of the escutcheon plate 32 remote from the side wall structure of the box lid the shaft 44 is provided with an operating handle or crank 59. The crank 59 may be formed of sheet metal and have at one end a non-round aperture closely receiving a non-round part of the shaft body 44ᵃ. A gasket or O-ring 60 of resilient rubber-like material is interposed between the last-mentioned end of the crank 59 and the escutcheon plate, the O-ring 60 embracing the shaft body 44ᵃ tightly to inhibit the seepage of moisture or vapor along the shaft 44. The end of the crank 59 which overlies the O-ring is enlarged and rounded to completely cover the O-ring, as shown in FIG. 1. The adjacent end of the cam shaft 44 is tapped to receive a round-headed bolt 61. A lock washer 62 is interposed between the head of the bolt and said end of the crank, the arrangement being such that the crank is held on the cam shaft 44 by the washer and the bolt, the O-ring being compressed between said end of the crank 59 and the escutcheon plate 32.

The form of the fastener illustrated in FIG. 10 is generally similar to the form described above. The slightly modified form of the box and sealing or gasket member for the box, shown in FIG. 10, has been mentioned above and need not be repeated here. However, in the fastener shown in FIG. 10, it will be observed that the catch member 65 is provided with an inwardly facing hook 66 at the lower extremity thereof, the hook 66 being extensible through a latching member 67 similar to the latching member 13 described above. As shown in FIG. 10, the upper extremity of the latching member 67 is straight instead of being hooked. Furthermore, the cam shaft 68, instead of having a crank bolted thereto, is provided with a non-round or hexagonal socket 69 to receive the end of a key wrench like the one shown in FIG. 10. Unlike the catch member 15 described above, the catch member 65 does not have a reverse bend directly above the hooked lower extremity.

In accordance with the foregoing disclosure there is provided an improved fastener which is especially useful on containers for protecting instruments or other mechanisms from moisture and vapor and which exerts a resilient downward pull on the lid of the container. There is also provided a fastener including a casing, a catch member extending into the casing for vertical movement relatively to the latter, and cam means extending into the casing and operable to move the catch member to the latched position thereof. Moreover, there is provided a fastener having a tiltable spring-pressed catch member which on vertical movement of the member in one direction is tilted by a cam part of the member co-acting with a part of the catch casing. A further feature of the fastener is that it is rugged, will not easily get out of order, and is constituted by relatively few and simple parts.

While two forms of the fastener have been illustrated in the drawings and described above, it will be apparent that the fastener is susceptible of various modifications and changes without departure from the principles of the invention and the scope of the claims.

What I claim is:

1. In a device for fastening an upper lid element to a lower body element of a box and having a retainer secured to the side of one of the elements and provided with a vertically displaceable latching member for engagement with a catch and spring-biased to exert a resilient pull on the latter, the improvement comprising a casing secured to the side of the other element, a catch member of sheet metal engageable with the latching member and extending into the casing for vertical movement, means for facewise tilting said catch member toward and away from the latching member to engage and disengage the latter, the catch member being spring-biased toward one of the tilted positions, said means for facewise tilting said catch member including a first cam part on the catch member engageable with a cam part of the casing to cam the catch member toward the other tilted position as the latter moves vertically in one direction, and cam means extending into the casing swingable on a horizontal axis and co-acting with a second cam part provided on the catch member to move the catch member in a vertical direction away from the element to which the retainer is secured, so that the two elements are resiliently drawn together.

2. In a device for releasably interconnecting two elements movable relatively to one another in vertical directions toward and away from each other, a retainer secured to the marginal portion of one element, provided with a displaceable latching member for engagement with a catch and spring-biased to exert a resilient pull on the latter, the improvement comprising a catch member of sheet metal for support by the opposite marginal portion of the other element, engageable with the latching member and having means defining a cam aperture therein, a cam shaft extending through said means and having a cam part engageable with the latter to move the catch member in a vertical direction away from said one of the elements, means on said other element supporting the cam shaft for turning movement, means supporting said catch member for tiltable movement relative to said cam part to swing toward and away from the latching member to engage and disengage the latter, means resiliently urging the catch member toward one of the tilted positions thereof, and a cam part in fixed relation to the means supporting the cam shaft and co-acting with a cam part of the catch member to cam the last-mentioned member to the other tilted position on movement of the catch member in one vertical direction.

3. In a device for releasably interconnecting two elements movable relatively to one another in vertical directions toward and away from each other, a retainer secured to the marginal portion of one element, provided with a displaceable latching member for engagement with a catch and spring-biased to exert a resilient pull on the latter, the improvement comprising catch means on the opposite marginal portion of the other element, comprising a catch member engageable with the latching member and having means defining a cam aperture therein, said catch means including a cam shaft extending through said aperture and having a cam part engageable with the means defining said aperture to move the catch member in a vertical direction away from said one of the elements, means supporting said catch member for tiltable movement relative to said cam part toward and away from the latching member to engage and disengage the latching member, means for biasing said catch member toward one of the tilted positions thereof, and the catch means including a cam part in fixed relation to said other element and co-acting with a corresponding part of the catch member to cam the last-mentioned member to the other tilted position on movement of the catch member in one vertical direction.

4. In a catch for releasably interconnecting two elements movable relatively to one another in vertical directions toward and away from each other, a retainer secured to the marginal portion of one element, provided with a displaceable latching member for engagement with a catch and spring-biased to exert a resilient pull on the latter, the improvement comprising a casing secured to the opposite marginal portion of the other element and having inner and outer webs and top and bottom walls, a vertically movable catch member extending into the casing and beyond the top and bottom walls adjacent the outer web, the catch member having a terminal part for engagement with the latching member and being tiltable inwardly and outwardly from the latching member to engage and disengage the latter, one of said walls together with the outer web limiting outward tilting movement of the member and the other wall limiting inward tilting movement, the catch member having a straight portion in flatwise engagement with the outer web in the outwardly tilted position of the catch member, and the catch member having an outwardly offset portion intermediate said straight portion and said terminal part, the offset portion being engaged with said other wall in the inwardly tilted position of the catch member, the catch member having means defining a cam aperture in said straight portion thereof, a horizontally disposed cam shaft extending through said aperture-defining means and having a cam part engageable with the latter to move the catch member to the fully latched position, the cam shaft being journaled in said webs, and a leaf spring of yoke form interposed between the inner web and the catch member and having the arms thereof straddling said aperture-defining means, the leaf spring urging the catch member to the outwardly tilted position thereof, and the offset portion of the catch member cooperating with a marginal portion of the outer web including an inclined lip to cam the catch member inwardly on movement of the latter to the fully latched position.

5. In a device for fastening one element to a second element and having a retainer secured to one of the elements and provided with a linearly movable latching member for engagement with a catch and biased to exert a resilient pull on the latter, the improvement comprising a casing secured to the other element, a catch member engageable with the latching member and extending into the casing for linear movement in alignment with the linear movement of said latching member, means supporting said catch member for tiltable movement relative to said casing toward and away from the latching member and said one of the elements to engage and disengage the latching member, the catch member being spring-biased toward one of the tilted positions and being provided with a first cam part engageable with a cam part of the casing to cam the catch member toward the other tilted position as the catch member moves linearly in one direction, and cam means extending into the casing swingable on an axis generally perpendicular to the axis of linear movement and co-acting with a second cam part provided on the catch member to move the catch member away from the element to which the retainer is secured, so that the two elements are resiliently drawn together.

References Cited in the file of this patent

UNITED STATES PATENTS

| | | |
|---|---|---|
| 659,069 | Ives | Oct. 2, 1900 |
| 1,369,713 | Smith | Feb. 22, 1921 |
| 1,784,475 | Young | Dec. 9, 1930 |
| 2,647,287 | Jones | Aug. 4, 1953 |
| 2,704,218 | Claud-Mantle | Mar. 15, 1955 |
| 2,714,751 | Stuart et al. | Aug. 9, 1955 |

FOREIGN PATENTS

| | | |
|---|---|---|
| 237,512 | Great Britain | July 30, 1925 |
| 493,768 | Great Britain | Oct. 10, 1938 |